US005282911A

United States Patent [19]

Natorff et al.

[11] Patent Number: 5,282,911

[45] Date of Patent: Feb. 1, 1994

[54] METHOD OF MAKING CURVED INSULATING GLAZING PANES

[75] Inventors: Mieczyslaw Natorff, Koln; Carl-Christoph Happich, Aachen; Franz-Peter Schaaf, Frechen, all of Fed. Rep. of Germany

[73] Assignee: Saint-Gobain Vitrage International, Courvevoie, France

[21] Appl. No.: 833,703

[22] Filed: Feb. 11, 1992

[30] Foreign Application Priority Data

Feb. 11, 1991 [DE] Fed. Rep. of Germany ....... 4104106

[51] Int. Cl.[5] .............................................. B32B 31/20

[52] U.S. Cl. ...................................... 156/99; 156/102; 156/105; 156/107; 156/109; 156/228; 156/285; 156/382; 65/102; 65/106; 65/287; 65/291

[58] Field of Search ................. 156/99, 102, 105, 107, 156/109, 228, 285, 382; 65/102, 106, 287, 291

[56] References Cited

U.S. PATENT DOCUMENTS 2,213,395 9/1940 Hopfield ............................ 156/109
2,316,993 4/1943 Sherwood ........................... 156/109
2,733,789 2/1956 Tolle .................................. 156/109
3,573,889 4/1971 McMaster et al. ................... 65/106

FOREIGN PATENT DOCUMENTS 3818631 12/1989 Fed. Rep. of Germany .
WO90/02696 3/1990 World Int. Prop. O. .

*Primary Examiner*—Caleb Weston
*Attorney, Agent, or Firm*—Oblon, Spivak, McClelland, Maier & Neustadt

[57] ABSTRACT

For the manufacture of curved insulating glazing panes having close tolerances of form, surface and thickness, the curved single glass sheets (2; 22) are brought to their desired shape via rigid suction mold plates (1; 21) and are glued together in this condition. A device suitable for carrying out this method consists of a press having two rigid plates (3; 23), template strips (4, 5; 24, 25) and positioning stops (8, 10; 28, 30) corresponding to the theoretical shape of the glass sheets, and also retractable suckers (15; 26) disposed between the template strips (4, 5; 24, 25), being mounted on the rigid plates (3; 23).

9 Claims, 2 Drawing Sheets

METHOD OF MAKING CURVED INSULATING GLAZING PANES

BACKGROUND OF THE INVENTION

Field of the Invention

This invention relates to a method of making curved insulating glazing panes, in which two curved single glass sheets are glued together at their edges with a spacer frame incorporated between them.

Description of the Related Art

Uses are being found to an increasing extent for curved insulating glazing panes for the side windows of automobiles. In contrast to flat insulating glazing panes, it is difficult in the case of curved insulating glazing panes to maintain close tolerances of surface, form and thickness. Even with curved single glass sheets, certain deviations of shape are unavoidable due to the bending process. Deviations in the shape of the single sheets may have a direct effect upon the area dimensions and thickness dimensions of the insulating glass pane. The deviations of shape of the single glass sheets can further increase if the curved single glass sheets are thermally toughened after bending, as is necessary in the case, for instance, of automobile panes to give them the characteristics of safety glass. If two curved glass sheets are processed together to form an insulating glazing pane, the deviations in shape become noticeable predominantly as changes in thickness in the edge regions of the insulating glazing panes. In unfavorable cases, the deviations in shape of the two single glass sheets may be added together in the insulating glazing pane.

Such variations in form and thickness from the specified values can become especially noticeable in the case of insulating glazing panes in which the individual glass sheets are not curved in pairs, but singly, and if the two individual glass sheets furthermore have different sizes as is the case, for instance, with opening door panes of stepped shape at the edge. It is just such automobile glazing panes, however, which are mounted to be movable in lateral guide rails, that must satisfy especially high requirements with regard to area tolerances and thickness of the insulating glazing panes.

SUMMARY OF THE INVENTION

An object of the present invention is to provide a method which makes possible the production of curved insulating glazing panes having comparatively tight tolerances of thickness and surface.

The method according to this invention consists in that at least one of the curved single glass sheets is deformed into its desired shape by elastic deformation, on the side corresponding to the outer face of the insulating glazing pane, by means of a suction mold plate that is rigid by comparison with the glass sheet, and in this condition is glued to the other glass sheet.

To achieve the closest tolerances possible, at least one of the single glass sheets advantageously is first corrected in shape by the suction mold plates corresponding to the desired form and the glass sheets are bonded together in this form-corrected shape, the suction mold plates being released from the glass sheets only when a sufficiently firm bond of these sheets to each other has been obtained.

Because the stiffness of the insulating glass pane is considerably greater than the stiffness of an individual glass sheet, the restoring forces created by the elastic deformations of the single glass sheets are not sufficient, after these two single sheets have been bonded together to form the insulating glazing pane, for restoring the sheets back to their shape, and the single glass sheets are fixed in the insulating glazing pane in their corrected form. Furthermore, deviations in shape are basically deviations in shape at the edge zones of the glass sheets, which as a rule are determined by slight twistings of the curved sheets. Such twistings can, however, even if only very slight, easily lead to comparatively large variations in thickness in the edge zone of the insulating glazing panes. The admissible thickness tolerances at the edge of the insulating glazing panes for automobiles are, however, normally considerably below 1 mm.

In a favorable further embodiment of the invention, to form the spacer frame, a strand of a highly viscous, permanently plastic sealing adhesive compound is applied onto the glass sheet deformed to its theoretical shape by means of an extrusion nozzle guided by a robot arm. In this manner the accuracy of laying of the sealing adhesive strand is increased. Since the displacement program of the robot arm is predetermined, then the more accurately that the edge region of the glass sheet corresponds in shape, and especially in surface dimensions, to the theoretical values, the greater will be the precisions of deposition of the sealing adhesive strand on the perimeter of the glass sheets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED OF THE PREFERRED EMBODIMENT

Figure 1:
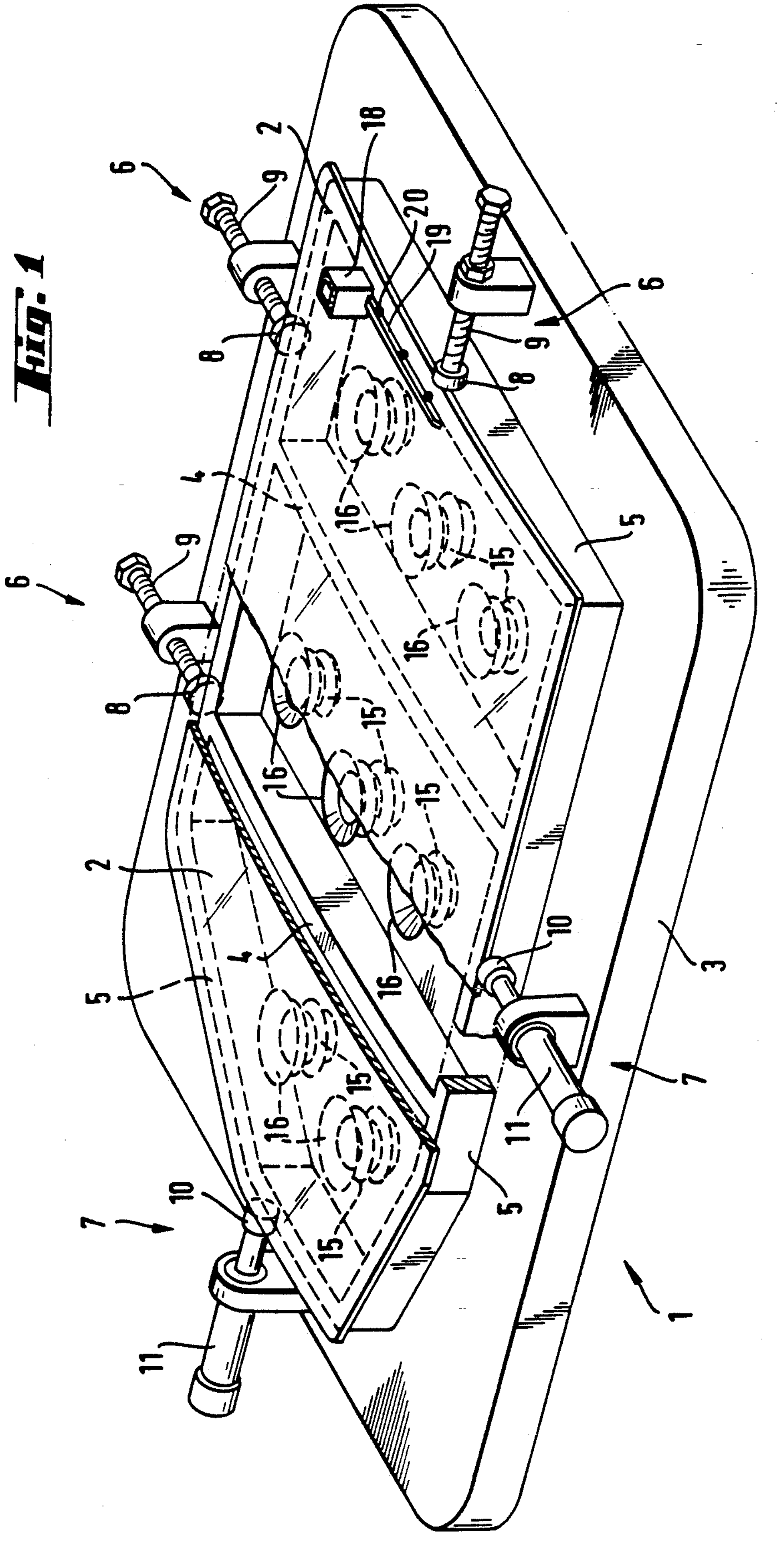
FIG. 1 shows a suction mold plate with suction and positioning devices in perspective view.

By use of the suction mold plate 1 illustrated in FIG. 1, the curved and preferably toughened glass sheet 2 of approximately 3 mm thick float glass is positioned and brought into its desired or theoretical shape.

The suction mold plate 1 comprises a form-stable baseplate 3 on which are mounted template strips 4 and a template frame 5 corresponding to the desired peripheral shape of the curved glass sheet. The upper surfaces of the template strip 4 and of the template frame 5 correspond accurately to the desired theoretical shape of the glass sheet in these regions. At the edge of the baseplate 3 are disposed stops 6, 7 by which the exact position of the glass sheet 2 with respect to the baseplate is determined. The stops 6 are fixed stops or abutments, in which the actual stop body 8 is adjustable to the desired position by means of a threaded spindle 9. The stops 7 each comprise a movable stop body 10 which is pressed by means of a pneumatic cylinder 11 against the edge of the sheet, and push the sheet 2 against the opposite fixed stops 6. In the at-rest position, the stop bodies 10 are in a retracted state so that the glass sheet 2 can be laid on the template strips 4 and the insulating glazing pane can be removed from them.

Between the individual template strips 4 and between the template strips 4 and the template frame 5 are disposed rows of retractable suckers, the upper contact surfaces of which, in the unloaded condition, lie above the theoretical shape surface of the glass sheet. As retractable suckers, there may be used conventional suction cups which are actuated by pneumatic cylinders (not shown) mounted on the rear face of the baseplate 3. In the case illustrated here, elastic bellows 15 are used as retractable suckers. When the glass sheet is being laid on the suction mold plate, the sealing lips 16 of the bellows 15 sealingly bear against the lower face of the glass sheet 2. As soon as vacuum is created in the vacuum system 32, 33 to which the bellows 15 are connected, the bellows 15 suck themselves tightly onto the glass sheet, contract in the axial direction and pull the glass sheet firmly against the surfaces of the template strips 4 and template frame 5.

When the glass sheet 2 has been positioned in this manner and brought to its theoretical shape, a strand 19 of a highly viscous, permanently plastic sealing adhesive compound is applied by means of an extrusion nozzle 18 guided by a robot arm, on the rim of the sheet at a distance of about 0.5 to 1 cm from its edge. This sealing adhesive strand serves as a spacer for the insulating glass pane and at the same time as a bonding strand. It is preferably of a butyl rubber mixed with a moisture-absorbing agent, especially with zeolites. The strand 19 is applied along the entire periphery of the sheet, and the joint between the start and end of the extruded strand is finished to the correct shape.

Simultaneously with the strand 19, balls 20 of aluminum or a comparable metal are placed against the side of the strand 19 towards the edge of the glass sheet and lightly pressed into the strand 19, so that they adhere to this strand by adhesive action. These balls 20 are provided to set the distance between the two single glass sheets.

Figure 2:
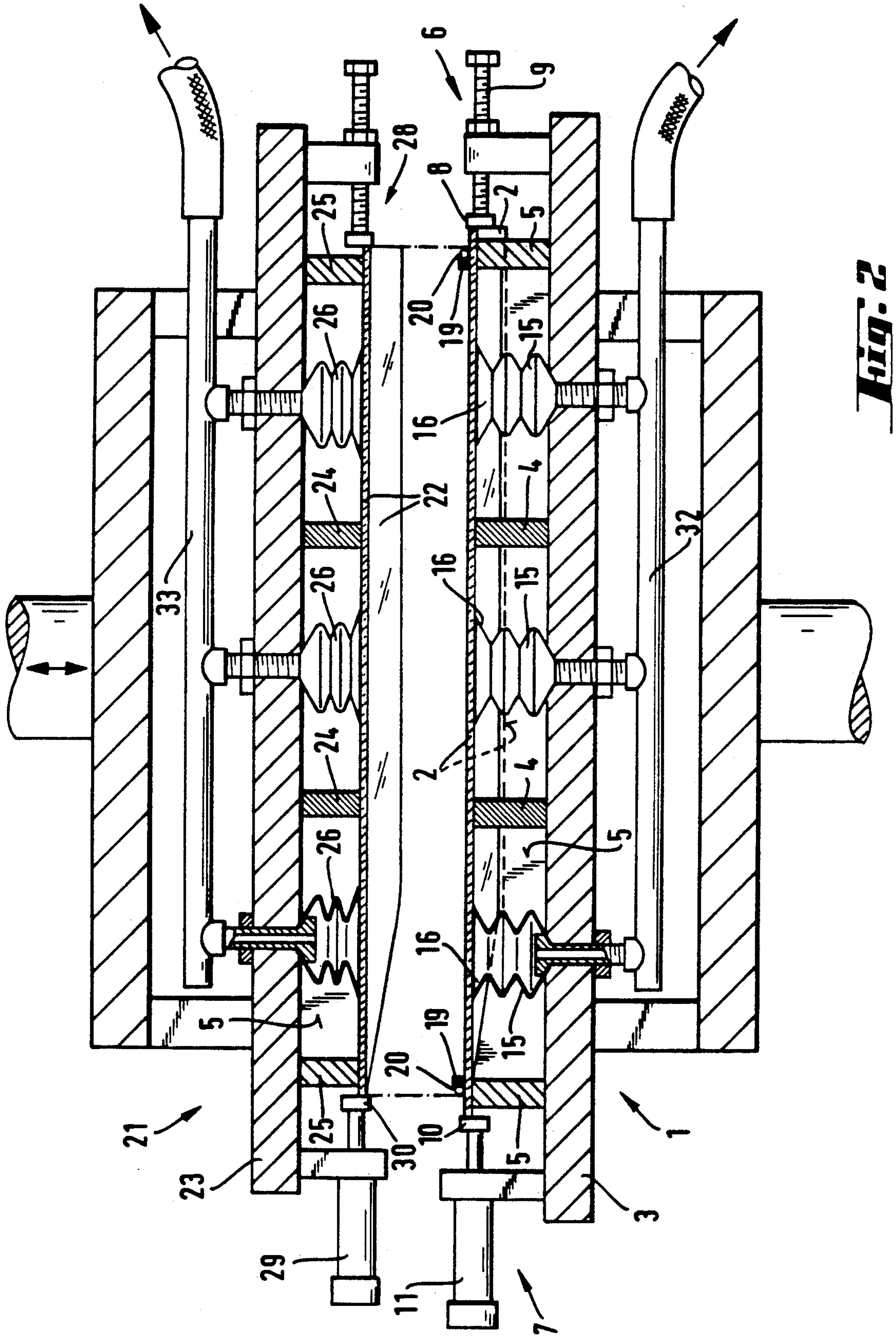
FIG. 2 shows a press comprising two suction mold plates in a schematic sectional view.

The other single glass sheet 22 is pressed against a suction mold plate 21 in the same manner as the glass sheet 2. The suction mold plate 21 also comprises, as shown in FIG. 2, a rigid baseplate 23, template strips 24 mounted on this baseplate 23, a template frame 25, corresponding to the desired peripheral shape, and elastic bellows 26 disposed between the template strips 24, and between the template strips 24 and the template frame 25. The suction mold plate 21 furthermore comprises fixed but adjustable stops 28, and stops 30 opposite stops 28 and actuated by pneumatic cylinders 29.

After the single glass sheets 2 and 22 have been positioned in this manner on the suction mold plate 3, 23 respectively and brought to the desired theoretical shape, and the sealing adhesive strand 19 has been laid on the glass sheet 2, the suction mold plates 3, 23 with the glass sheets 2, 22 are pressed together. For this purpose, the two suction mold plates 3, 23 are advantageously integrated into a press, as illustrated schematically in FIG. 2. Inside this press the two suction mold plates 3, 23 are positioned relative to one another so that the exact positioning of the two single glass sheets in relation to one another is assured. During the pressing operation, the suction systems 32 and 33, to which the bellows 15, 26 respectively are connected, remain under vacuum for a sufficiently long time for the pressing operation to be completed and the necessary bonding by the sealing adhesive strand 19 to be assured.

When the insulating glass pane has been removed from the press after the pressing operation, the groove remaining at the perimeter between the strand 19 and the edge zones of the single glass sheets is filled by injection in the usual manner with a hardening adhesive material, for example a polysulphide such as thiokol.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A method of making curved insulating glazing panes, comprising the steps of:
   - using a suction to elastically deform a first curved glass sheet with respect to a rigid mold plate and into a theoretical desired shape; and
   - bonding another curved glass sheet to the first glass sheet while the first glass sheet is elastically deformed into the theoretical desired shape by the rigid suction mold plate.

2. The method of claim 1, wherein said step of elastically deforming the first glass sheet into a theoretical desired shape comprises:
   - laying a surface of the first glass sheet on the suction mold plate having suction means and a configuration corresponding to the theoretical desired shape; and
   - applying suction to the first glass sheet via the suction means such that the first glass sheet is pressed on, and acquires the configuration of, the suction mold plate.

3. The method of claim 2, wherein said bonding step comprises:
   - applying a strand of curable adhesive sealing compound adjacent the edge of a surface of the first glass sheet opposite the surface laid on the suction mold plate;
   - laying the another curved glass sheet on the first glass sheet with the adhesive strand therebetween; and
   - maintaining the suction on the first glass sheet until the adhesive strand has cured sufficiently to the two glass sheets to assure that the two glass sheets are bonded to each other.

4. The method of claim 1, including the step of using another rigid suction mold plate to elastically deform the another curved glass sheet into the theoretical desired shape, wherein said bonding step is performed with said another curved glass sheet having the theoretical desired shape.

5. The method of claim 2, including the step of using another rigid suction mold plate to elastically deform the another curved glass sheet into the theoretical desired shape, wherein said bonding step is performed with said another curved glass sheet having the theoretical desired shape.

6. The method of claim 3, including the step of using another rigid suction mold plate to elastically deform the another curved glass sheet into the theoretical desired shape, wherein said bonding step is performed with said another curved glass sheet having the theoretical desired shape.

7. The method of claim 1, wherein said glass sheets are thermally toughened.

8. The method of claim 4, wherein said bonding step is performed with said rigid suction mold plates held in aligned presses.

9. The method of claim 6, wherein said bonding step is performed with said rigid suction mold plates held in aligned presses.

* * * * *